United States Patent
Yomogida

(10) Patent No.: US 6,588,403 B2
(45) Date of Patent: Jul. 8, 2003

(54) ENGINE FUEL INJECTION CONTROL DEVICE

(75) Inventor: Koichiro Yomogida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 92 days.

(21) Appl. No.: 09/964,107

(22) Filed: Sep. 25, 2001

(65) Prior Publication Data

US 2002/0011237 A1 Jan. 31, 2002

(51) Int. Cl.$^7$ .............................................. F02D 41/30
(52) U.S. Cl. ...................... 123/478; 123/494; 123/436; 701/104; 701/110
(58) Field of Search .................... 123/436, 456, 123/472, 478, 480, 490, 492, 493, 494, 399; 701/103, 104, 110, 115, 111

(56) References Cited

U.S. PATENT DOCUMENTS

| 6,016,788 | A | * | 1/2000 | Kibe et al. | 123/399 |
| 6,065,449 | A | * | 5/2000 | Fukuma | 123/436 |
| 6,308,698 | B1 | * | 10/2001 | Shioi et al. | 123/680 |
| 2002/0020396 | A1 | * | 2/2002 | Sakamoto | 123/492 |

FOREIGN PATENT DOCUMENTS

| JP | 07-158483 | 6/1995 | ........... F02D/41/10 |
| JP | 08-303278 | 11/1996 | ........... F02D/41/10 |

* cited by examiner

Primary Examiner—Tony M. Argenbright
Assistant Examiner—Hai Huynh
(74) Attorney, Agent, or Firm—McCormick, Paulding & Huber LLP

(57) ABSTRACT

An engine fuel injection control device whereby appropriate engine output is obtained without generation of smoke, by determining a smoke limit fuel injection amount, using an inferred air intake amount when the engine operating condition is in a transient state etc. An inferred air intake amount calculation device (42) calculates an inferred air intake amount by using the target fuel injection amount on the previous occasion and the engine rotational speed. If the air amount deviation between the inferred air intake amount and the detected air intake amount detected by a mass airflow sensor (34) is more than a prescribed value, the detected air intake amount is deemed to be subject to detection lag. Then, the inferred air intake amount is selected as the final air intake amount, and the final fuel injection amount is calculated in accordance with this final air intake amount.

20 Claims, 4 Drawing Sheets

ENGINE FUEL INJECTION CONTROL DEVICE

This application corresponds to Japanese Patent Application No. 11-344735 filed in JPO on Dec. 3, 1999, the entire disclosure of which is incorporated herein by reference.

BACKGROUND OF THE INVENTION

1. Field of the Invention

The present invention relates to an engine fuel injection control device wherein the fuel injection amount is controlled in accordance with the amount of air intake into the engine in order to prevent generation of smoke in the exhaust gas.

2. Description of the Related Art

Conventionally, in engine fuel injection control of, for example, diesel engines, smoke caused by incomplete combustion of the fuel is generated if the fuel injection is excessive with respect to the air intake amount of the engine, so in order to prevent production of such smoke, control has been proposed wherein the air intake amount actually provided into the engine is detected by disposing an air intake amount sensor in the air intake pipe, and the fuel injection amount is restricted such that the fuel injection amount is not excessive for the detected air intake amount (for example, Japanese Patent Application Laid-Open Publication Nos. 7-158483 and 8-303278).

With the fuel injection control of a diesel engine disclosed in Japanese Patent Application Laid-Open Publication No. 7-158483, a basic fuel injection amount calculated from the degree of accelerator opening and engine rotational speed is compared with a maximum fuel injection amount calculated from the intake amount of fresh air and the engine rotational speed, the smaller of the basic injection amount and maximum injection amount is taken as the final fuel injection amount. Moreover, if the basic fuel injection amount exceeds the maximum injection amount, the maximum fuel injection amount is increased in response to the difference (expressing the degree of cleanliness of the recirculated exhaust gas) between the ratios of the basic injection amount and the maximum fuel injection amount after and before the basic injection amount exceeds the maximum fuel injection amount, and the increased maximum fuel injection amount is taken as the final injection amount. Thereby, achievement of both prevention of generation of smoke during vehicle acceleration and smooth acceleration is aimed at.

With the diesel engine fuel injection control disclosed in Japanese Patent Application Laid-Open Publication No. 8-303278, a cylinder air intake amount found from a detected value of air intake amount is read. Moreover, a limit air excess amount is calculated by multiplying a limit air excess amount set with respect to the engine rotational speed by a limit air excess amount set with respect to the air intake pressure. By calculating an allowed maximum fuel injection amount based on these values, optimization of the diesel engine emissions and operating characteristics is aimed at.

However, since the distance between the air intake amount sensor and engine cylinders is the result of the addition not only of the length of the air intake pipe itself but also the length of the air intake manifold, there is usually an error, due to response lag, between the detected air intake amount detected by the air intake amount sensor and the amount of actual introduction of air into the cylinders. If the operating condition of the engine is a steady operating condition, such a response lag in regard to detection of air intake amount can be practically neglected in fuel injection amount control. However, a method in which more accurate calculation is carried out in order to perform more precise control has been studied. In this calculation, an air intake amount introduced into the cylinder is calculated more accurately by taking into account the response lag in respect of the detected air intake amount detected by the air intake amount sensor. Thereby, a smoke limit fuel injection amount regarded as a limit value for the generation of smoke is found from a calculated value of the air intake amount.

However, although such a calculation taking into account response lag functions normally when engine is in a steady operating condition, variability of response lag is produced when a condition shifts to a transient operating condition. When fuel injection is performed in accordance with the fuel injection amount found with respect to the air intake amount, problems can arise such as that smoke is generated, or the necessary engine output is not obtained because the fuel injection amount is excessively limited.

Accordingly, a problem to be solved lies in making it possible to determine a fuel injection amount such that smoke is not generated by detecting a shift of the engine to a transient operating condition and reliably ascertaining the air intake amount even when variability in the response lag occurs.

SUMMARY OF THE INVENTION

In view of the above, an object of the present invention is to provide an engine fuel injection control device. In this device, generation of smoke or insufficiency of engine output due to excessive limitation of the fuel injection amount can be prevented by detecting a shift of the engine to a transient operating condition and suitably determining the fuel injection amount for the air intake amount which is precisely determined, even if variability in the response lag occurs.

According to one aspect of the present invention, there is provided an engine fuel injection control device including basic fuel injection amount calculation means for calculating a basic fuel injection amount from engine rotational speed and amount of accelerator operation, and air intake amount detection means established in an air intake pipe of the engine for detecting the air intake amount provided to the engine. The engine fuel injection control device further includes inferred air intake amount calculation means for calculating an inferred air intake amount inferred to be provided to the engine by using the target fuel injection amount on an occasion prior to the current occasion and the rotational speed of the engine. The engine fuel injection control device still further includes final air intake amount determination means for comparing the air amount deviation between the detected air intake amount detected by the air intake amount detection means and the inferred air intake amount calculated by the inferred air intake amount calculation means with a predetermined value. This final air intake amount determination means determines the detected air intake amount as the final air intake amount in response to the air intake amount deviation being at or below the predetermined value. The final air intake amount determination means determines the inferred air intake amount as the final air intake amount in response to the air intake amount deviation being larger than the predetermined value. The engine fuel injection control device also includes smoke limit fuel injection amount calculation means for calculating a injectable smoke limit fuel injection amount at which smoke can be generated in relation to the final air intake amount determined by the final air intake amount determining means. The engine fuel injection control device also includes target fuel injection amount setting means for comparing the basic fuel injection amount calculated by the basic fuel injection amount calculating means with the smoke limit fuel injection amount and for setting the smaller of these values as the current target fuel injection amount.

With this engine fuel injection amount control device, an inferred air intake amount inferred air inferred to be provided to the engine is calculated by the inferred air intake amount calculation means, based on the target fuel injection amount on an occasion prior to the current occasion and the engine rotational speed. When the engine shifts to a transient state, whether the detected air intake amount detected by the air intake amount detection means is correct or not can be judged by comparison with the inferred air intake amount. If the air amount deviation between the detected air intake amount detected by the air intake amount detection means and the inferred air intake amount calculated by the inferred air intake amount calculation means is larger than a predetermined value, the operating condition of the engine may be deemed to be in a transient state. In this case, there is a response lag in the detected air intake amount detected by the air intake amount detection means compared with the air intake amount provided into the cylinder, so the final air intake amount determination means determines the inferred air intake amount which is closer to the actually provided air intake amount, as the final air intake amount.

The smoke limit fuel injection amount calculation means calculates an injectable smoke limit fuel injection amount in relation to the final air intake amount determined in this way. This is regarded as limit value of smoke occurrence. The target fuel injection amount setting means compares the basic fuel injection amount calculated by the basic fuel injection amount calculation means with the smoke limit fuel injection amount, and sets the smaller of these values as the current target fuel injection amount. Therefore, it is possible to perform fuel injection control which adjusts to the operating state and which prevents smoke occurrence.

The inferred air intake amount calculating means calculates the inferred air intake amount by correcting the basic inferred air intake amount determined from the target fuel injection amount on an occasion prior to the current occasion and from the engine rotational speed. This correction is carried out by using the injection amount deviation between the target fuel injection amount on the previous occasion and the target fuel injection amount on an occasion prior to the current occasion. The air intake amount varies with the time difference in accordance with the varying amount per unit time of the fuel injection amount. Consequently, it is possible to obtain a more accurate inferred air intake amount by performing a time lag correction based on the varying amount of the fuel injection amount in the calculation of the inferred value.

Preferably, the inferred air intake amount calculating means calculates the inferred air intake amount by using the following formula:

$$Mafe=Mafe(-1)+K\times\{Mafeb-Mafe(-1)\}$$

where

Mafe is the current inferred air intake amount;

Mafe (−1) is the inferred air intake amount on the previous occasion;

K is the lag correction coefficient calculated by using the injection amount deviation; and Mafeb is the basic inferred air intake amount.

The lag correction coefficient K may be a value satisfying $0<K<1$.

Preferably, the final air intake amount determining means calculates the air amount deviation by subtracting the inferred air intake amount from the detected air intake amount, compares the ratio calculated by dividing the absolute value of this air amount deviation by the inferred air intake amount with a prescribed error width, determines the detected air intake amount as the final air intake amount in response to the ratio being at or below the error width, and determines the inferred air intake amount as the final air intake amount in response to the ratio being larger than the error width.

Preferably, the final air intake amount determining means determines the inferred air intake amount as the final air intake amount only if the state of the ratio being larger than the error width continues for a prescribed time.

Preferably, the smoke limit fuel injection amount calculating means calculates the smoke limit fuel injection amount from a map which has been predetermined on the basis of the final air intake amount and the engine rotational speed.

Preferably, the engine fuel injection control device according to the present invention is applied to a common rail type diesel engine including a high-pressure supply pump, a common rail that accumulates fuel supplied from this high-pressure supply pump, an injector that injects fuel supplied from the common rail into an engine combustion chamber when an electromagnetic actuator is driven, and a controller that provides control current to the electromagnetic actuator for driving the electromagnetic actuator for a prescribed time in a prescribed period.

According to another aspect of the present invention, there is provided an engine fuel injection control device including a basic fuel injection amount calculation device for calculating a basic fuel injection amount from engine rotational speed and amount of accelerator operation, and an air intake amount detection device established in an air intake pipe of the engine for detecting the air intake amount provided to the engine. The engine fuel injection control device further includes an inferred air intake amount calculation device for calculating an inferred air intake amount inferred to be provided to the engine by using the target fuel injection amount on an occasion prior to the current occasion and the rotational speed of the engine. The engine fuel injection control device still further includes a final air intake amount determination device for comparing the air amount deviation between the detected air intake amount detected by the air intake amount detection device and the inferred air intake amount calculated by the inferred air intake amount calculation device with a predetermined value. This final air intake amount determination device determines the detected air intake amount as the final air intake amount in response to the air intake amount deviation being at or below the predetermined value. The final air intake amount determination device determines the inferred air intake amount as the final air intake amount in response to the air intake amount deviation being larger than the predetermined value. The engine fuel injection control device also includes a smoke limit fuel injection amount calculation device for calculating a injectable smoke limit fuel injection amount at which smoke can be generated in relation to the final air intake amount determined by the final air intake amount determining device. The engine fuel injection control device also includes a target fuel injection amount setting device for comparing the basic fuel injection amount calculated by the basic fuel injection amount calculating device with the smoke limit fuel injection amount and for setting the smaller of these values as the current target fuel injection amount.

Preferably the inferred air intake amount calculating device calculates the inferred air intake amount by correcting the basic inferred air intake amount determined from the target fuel injection amount on an occasion prior to the current occasion and from the engine rotational speed. This correction is performed, based on the injection amount deviation between the target fuel injection amount on the previous occasion and the target fuel injection amount on the occasion directly before the previous occasion.

Preferably the inferred air intake amount calculating device calculates the inferred air intake amount using the following formula:

$$Mafe=Mafe(-1)+K\times\{Mafeb-Mafe(-1)\}$$

where

Mafe is the current inferred air intake amount;

Mafe (−1) is the inferred air intake amount on the previous occasion;

K is the lag correction coefficient calculated using the injection amount deviation; and Mafeb is the basic inferred air intake amount.

Preferably the lag correction coefficient K is a value satisfying 0<K<1.

Preferably, the final air intake amount determining device calculates the air amount deviation by subtracting the inferred air intake amount from the detected air intake amount, compares the ratio calculated by dividing the absolute value of this air amount deviation by the inferred air intake amount with a prescribed error width, determines the detected air intake amount as the final air intake amount in response to the ratio being at or below the error width, and determines the inferred air intake amount as the final air intake amount in response to the ratio being larger than the error width.

Preferably, the final air intake amount determining device determines the inferred air intake amount as the final air intake amount only if the state of the ratio being larger than the error width continues for a prescribed time.

According to another aspect of the present invention, there is provided an engine fuel injection control method including a basic fuel injection amount calculation step of calculating a basic fuel injection amount from engine rotational speed and amount of accelerator operation, and an air intake amount detection step of detecting the air intake amount provided to the engine. The engine fuel injection control method further includes an inferred air intake amount calculation step of calculating an inferred air intake amount inferred to be provided to the engine by using the target fuel injection amount on an occasion prior to the current occasion and the rotational speed of the engine. The engine fuel injection control method still further includes a final air intake amount determination step of comparing the air amount deviation between the detected air intake amount detected in the air intake amount detection step and the inferred air intake amount calculated in the inferred air intake amount calculation step with a predetermined value. In this final air intake amount determination step, the detected air intake amount is determined as the final air intake amount in response to the air intake amount deviation being at or below the predetermined value. In the final air intake amount determination step, the inferred air intake amount is determined as the final air intake amount in response to the air intake amount deviation being larger than the predetermined value. The engine fuel injection control method also includes a smoke limit fuel injection amount calculation step of calculating a injectable smoke limit fuel injection amount at which smoke can be generated in relation to the final air intake amount determined in the final air intake amount determining step. The engine fuel injection control method also includes a target fuel injection amount setting step of comparing the basic fuel injection amount calculated in the basic fuel injection amount calculating step with the smoke limit fuel injection amount and of setting the smaller of these values as the current target fuel injection amount.

Preferably, in the inferred air intake amount calculating step, the inferred air intake amount is calculated by correcting the basic inferred air intake amount determined from the target fuel injection amount on an occasion prior to the current occasion and from the engine rotational speed. This correction is performed, based on the injection amount deviation between the target fuel injection amount on the previous occasion and the target fuel injection amount on the occasion directly before the previous occasion.

Preferably, in the inferred air intake amount calculating step, the inferred air intake amount is calculated by using the following formula:

$$Mafe=Mafe(-1)+K\times\{Mafeb-Mafe(-1)\}$$

where

Mafe is the current inferred air intake amount;

Mafe (−1) is the inferred air intake amount on the previous occasion;

K is the lag correction coefficient calculated using the injection amount deviation; and Mafeb is the basic inferred air intake amount.

Preferably the lag correction coefficient K is a value satisfying 0<K<1.

Preferably, in the final air intake amount determining step, the air amount deviation is calculated by subtracting the inferred air intake amount from the detected air intake amount, compares the ratio calculated by dividing the absolute value of this air amount deviation by the inferred air intake amount with a prescribed error width, determines the detected air intake amount as the final air intake amount in response to the ratio being at or below the error width, and determines the inferred air intake amount as the final air intake amount in response to the ratio being larger than the error width.

Preferably, in the final air intake amount determining step, the inferred air intake amount is determined as the final air intake amount only if the state of the ratio being larger than the error width continues for a prescribed time.

DETAILED DESCRIPTION OF THE INVENTION

An engine fuel injection control device according to one embodiment of the present invention is described below with reference to the appended drawings.

Figure 4:
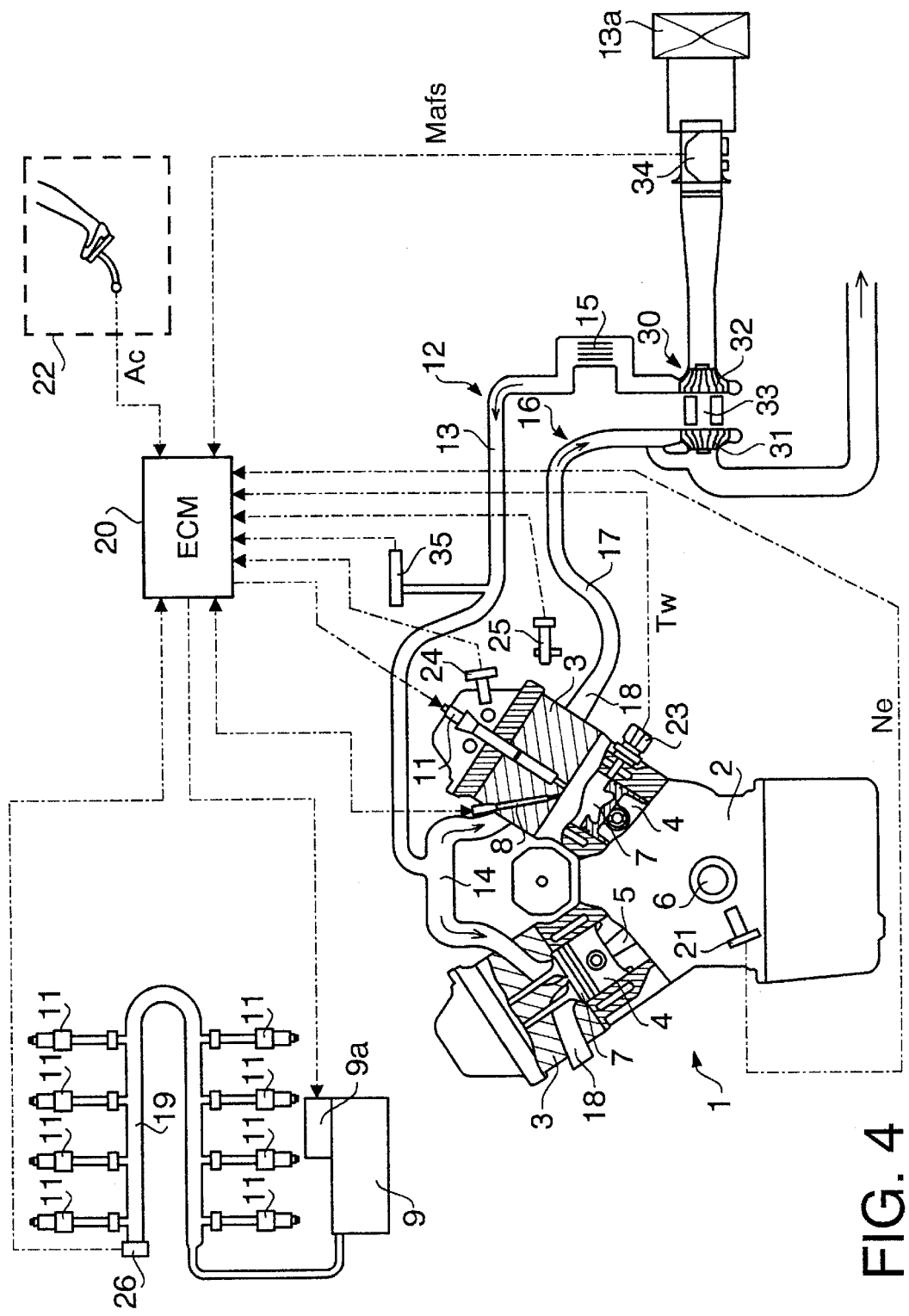
FIG. 4 is a diagram illustrating an example of an engine to which the fuel injection control device of FIG. 1 is applied.

FIG. 4 shows an engine 1 including a supercharger to which a fuel injection control device according to one embodiment of the present invention is applied. Engine 1 is a V-type eight cylinder engine comprising a cylinder block 2 forming cylinder bores, and cylinder heads 3 mounted on the cylinder block 2; the reciprocatory motion of pistons 4 which are freely slidable within cylinder liners arranged on the cylinder bores is converted into rotary movement of a crankshaft 6 by means of connecting rods 5.

In the electronically controlled fuel injection system of engine 1, operational fluid constituted by fuel or engine oil supplied under pressure from a high-pressure supply pump 9 provided in the fuel supply system is accumulated in a common rail 19 and supplied from the common rail 19 to injectors 11. A plurality of injectors 11 (eight in the example illustrated) corresponding to the number of cylinders are provided in cylinder head 3 and consist of a unitary combination of an injector body that performs fuel injection and an electromagnetic actuator for controlling fuel injection from the nozzle and for stopping injection. The injector 11 is operated by operational fluid from the common rail 19 and injects fuel directly into a fuel chamber 7 with a fuel injection pressure that is raised to a value corresponding to the operating condition of the engine. In the case where engine 1 is a diesel engine, the fuel that is injected into the combustion chamber 7 is ignited by compression. Glow plug 8 performs pre-heating of the interior of the combustion chamber 7 in the case of low-temperature start-up. An electronically controlled fuel injection system 10 includes a controller 20 constituting an electronic control unit (ECM). The controller 20 receives detection signals from the sensors that detect operating condition of engine 1 and the controller 20 controls fuel injection from the injectors 11 by controlling the actuators provided on the injectors 11 and controlling the pressure (rail pressure) in the common rail 19 by controlling a flow amount control valve 9a provided on the high-pressure supply pump 9 in accordance with these detection signals.

A crank angle sensor 21 for detecting the rotational speed Ne of engine 1 is constituted by a sensor such as an electromagnetic pickup that detects a gearwheel formed with a missing tooth that is fixed to crankshaft 6 and rotates together with crankshaft 6. In addition to the detection signal from the crank angle sensor 21, the controller 20 inputs detection signals from an accelerator operating amount sensor 22 that detects the accelerator operating amount (amount of depression of the accelerator pedal) Ac, a water temperature sensor 23 that detects the water temperature Tw of cooling water circulating through a cylinder block 2 (or an oil temperature sensor that detects the lubricating oil temperature), a cam sensor 24 that detects the shaft rotation angle of a cam that operates an intake/exhaust valve provided on a cylinder head 3, an atmospheric pressure sensor 25, and a pressure sensor 26 arranged on the common rail 19, etc.

The injection time point and injection amount with which fuel is injected from the injectors 11 are controlled by controlling the current passage time point and current passage period of the control currents to the actuators from the controller 20. The controller 20 controls the fuel injection amount by determining the current passage period (pulse width) to the actuators in accordance with a target fuel injection amount, which is a target value calculated from the operating condition of the engine, and by driving the actuators in accordance with this pulse width. The crank angle detected by the crank angle sensor 21, together with the detection signals of the various sensors that detect arrival of the piston at the top dead center of compression or at a position at a prescribed angle in advance of the compression top dead center in the reference cylinder or in each cylinder is used to control the current passage start time point and current passage period of the drive current that drives the actuators.

In the air intake system 12 to an engine 1, an air intake pipe 13 by which air from outside is taken through air cleaner 13a is connected to the engine 1 through an intake manifold 14. The intake manifold 14 communicates with the combustion chamber 7 through an intake valve (not shown). In order to improve the filling efficiency, an inter-cooler 15 is provided for cooling the intake air into air intake pipe 13. In an exhaust system 16, an exhaust pipe 17 is connected to the engine 1 through an exhaust manifold 18 for exhausting exhaust gas to outside from the engine 1. The exhaust manifold 18 communicates with the combustion chamber 7 through an exhaust valve (not shown). Although not shown, an exhaust gas cleaning device and an energy recovery device for recovering energy contained in the exhaust gas are arranged on the exhaust pipe 17.

A supercharger 30 including a variable nozzle turbine is arranged between the air intake system 12 and the exhaust system 16. The supercharger 30 includes a turbine 31 arranged on the side of the exhaust system 16 and whose turbine blades are driven by high-temperature exhaust gas, a compressor 32 that compresses the intake air and is driven by the turbine 31 and arranged on the side of the air intake system 12, and a shaft 33 that connects the turbine 31 and the compressor 32.

A mass airflow sensor 34 constituting air intake amount detection means that detects the amount of air passing therethrough is provided on the air intake pipe 13 on the upstream side of the supercharger 30. Mass airflow sensor 34 may be the air weight detection type or the air volume detection type (in this case, an intake air temperature sensor is provided for detecting the temperature of the intake air, and the air weight is calculated from the air volume and intake air temperature). A boost pressure sensor 35 for detecting the intake air pressure may be provided in the air intake pipe 13 on the downstream side of the supercharger 30. A signal in respect of the air intake amount detected by the mass airflow sensor 34 and a signal in respect of the air intake pressure detected by the boost pressure sensor 35 are respectively input to controller 20.

Figure 1:
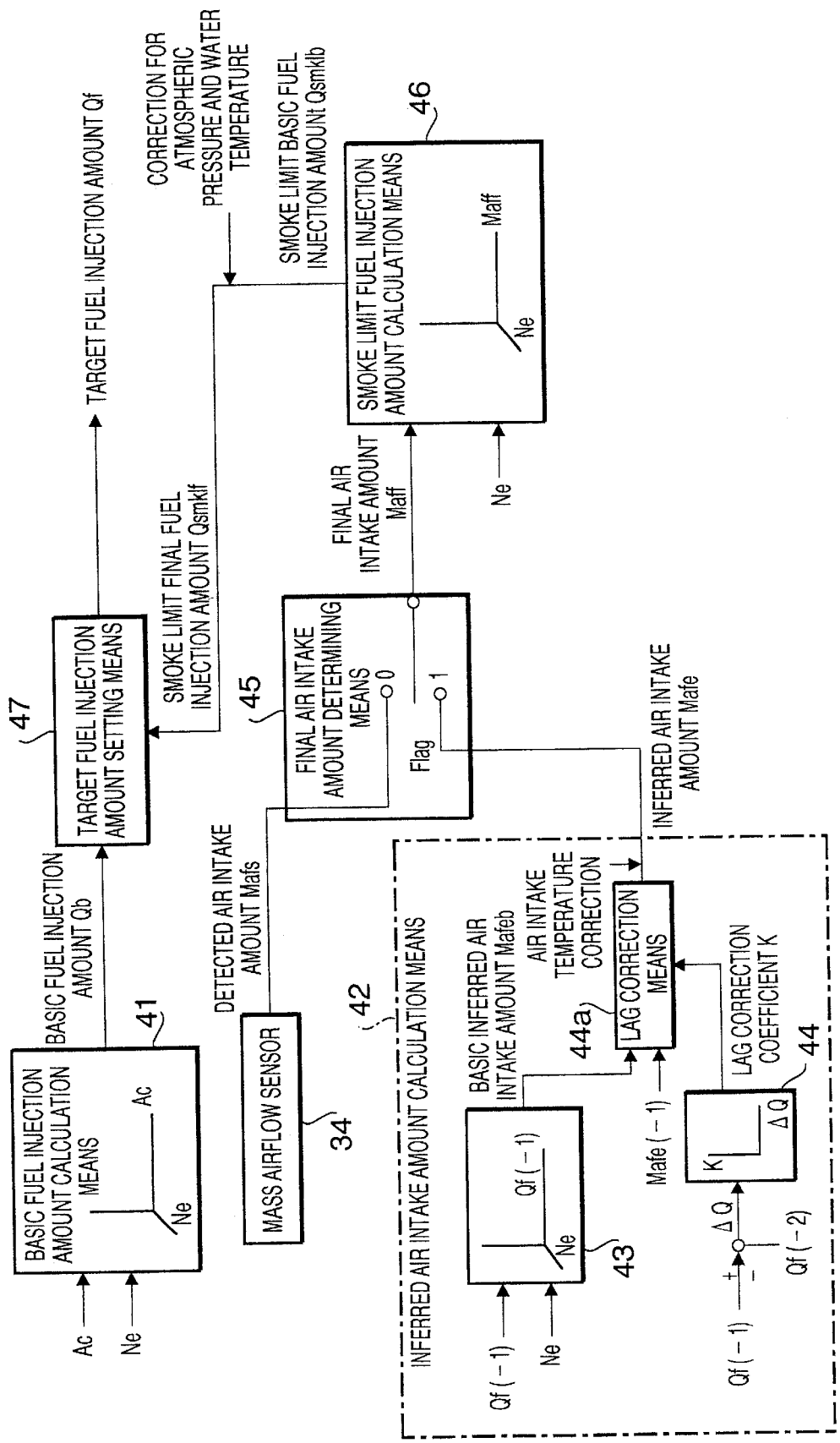
FIG. 1 is a block diagram illustrating an engine fuel injection control device according to one embodiment of the present invention.

An engine fuel injection control device according to the embodiment of the present invention is described with reference to the block diagram shown in FIG. 1. The basic fuel injection amount calculation means 41, based on the engine rotational speed Ne detected by means of the detection signal from crank angle sensor 21 and accelerator operating amount Ac such as the accelerator pedal depression amount detected by the accelerator pedal depression amount sensor 22, calculates the basic fuel injection amount Qb, with Ne and Ac as the operating condition of engine 1, using a predetermined map. Also, the air intake amount detection means constituted by the mass airflow sensor 34 arranged on the air intake pipe 13 of the engine 1 detects the detected air intake amount Mafs as the amount of air intake to the engine 1.

The inferred air intake amount calculating means 42 calculates the basic inferred air intake amount Mafeb inferred to be admitted to the engine 1 in accordance with a predetermined map 43, on the basis of the target fuel injection amount on the previous occasion i.e. the target fuel injection amount Qf (−1) on the previous occasion (hereinbelow (−1) denotes the previous occasion) and the engine rotational speed Ne. The basic inferred air intake amount Mafeb tends to become larger as the target fuel injection amount Qf (−1) on the previous occasion becomes larger. The lag correction coefficient K (0<K<1) in accordance with the injection amount deviation ΔQ is calculated by a map 44, after finding the injection amount deviation ΔQ between the target fuel injection amount Qf (−1) on the previous occasion and the target fuel injection amount Qf (−2) on the occasion directly before the previous occasion (hereinbelow (−2) represents the occasion directly before the previous occasion). The lag correction coefficient K is a value which becomes smaller as the injection amount deviation ΔQ becomes larger. Lag correction means 44a serves to correct the temporal lag of change of air intake amount produced by the magnitude of the injection amount deviation ΔQ. The lag time also tends to become longer as the injection amount deviation ΔQ increases, so the current inferred air intake amount Mafe is found by performing a lag correction that corrects the previous inferred air intake amount Mafe (−1) by means of calculation formula (1) given below, which is generally employed, based on the basic inferred air intake amount Mafeb and lag correction coefficient K.

$$Mafe = Mafe\ (-1) + K \times \{Mafeb - Mafe\ (-1)\} \quad \text{formula (1)}$$

Furthermore, the inferred air intake amount calculation means 42 calculates inferred air intake amount Mafe, taking into account an intake air temperature correction. The inferred air intake amount Mafe of calculation formula (1) above is the inferred air intake amount prior to performing the intake air temperature correction, but for convenience the same symbol Mafe is employed both before and after intake air temperature correction.

Final air intake amount determination means 45 compares the deviation i.e. air amount deviation ΔMaf between the detected air intake amount Mafs detected by the mass airflow sensor 34 and the inferred air intake amount Mafe calculated by the inferred air intake amount calculation means 42, with the value $\Delta Maf_0$ which is determined beforehand; if air amount deviation ΔMaf is less than or equal to the value $\Delta Maf_0$, flag 0 is selected and the detected air intake amount Mafs is determined as the final air intake amount Maff; if air amount deviation ΔMaf is more than the value $\Delta Maf_0$, flag 1 is selected and the inferred air intake amount Mafe is determined as the final air intake amount Maff.

Smoke limit fuel injection amount calculating means 46 calculates the injectable smoke limit fuel injection amount which is taken as the limiting value at which smoke is generated, in respect of the final air intake amount Maff determined by the final air intake amount determining means 45. Specifically, smoke limit fuel injection amount calculating means 46 calculates a smoke limit basic fuel injection amount Qsmklb from a predetermined map, using the engine rotational speed Ne, in respect of the final air intake amount Maff. The smoke limit final fuel injection amount Qsmklf (corresponding to the smoke limit fuel injection amount in the present invention) is calculated by applying correction for atmospheric pressure and/or water temperature etc to the smoke limit basic fuel injection amount Qsmklb.

Figure 2:
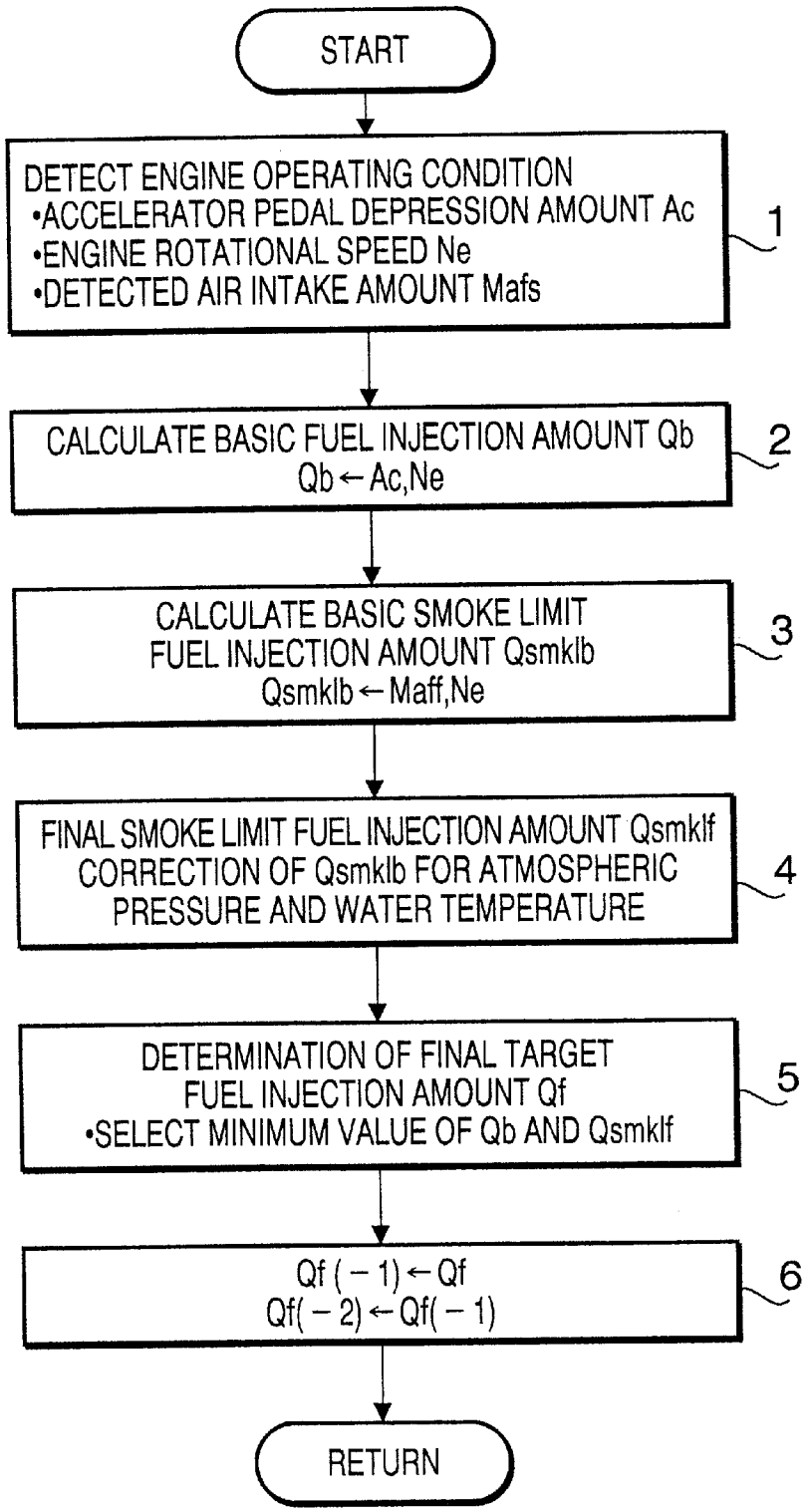
FIG. 2 is a flowchart of the determination of fuel injection amount in the engine fuel injection control device shown in FIG. 1.

Target fuel injection amount setting means 47 receives input of the basic fuel injection amount Qb calculated by the basic fuel injection amount calculating means 41 and the smoke limit final fuel injection amount Qsmklf calculated by the smoke limit fuel injection amount calculating means 46, and functions as a minimum value setter in respect of these two fuel injection amounts; the target fuel injection amount setting means 47 compares these two fuel injection amounts and sets the smallest value of these as the current target fuel injection amount Qf FIG. 2 shows a determination flowchart of fuel injection amount (specifically, the final fuel injection amount). As shown in FIG. 2, detection means including various sensors detects the engine operating condition (step 1). In fuel injection control according to the embodiment of the present invention, the engine operating condition to be detected includes the accelerator pedal depression amount Ac, engine rotational speed Ne, and air intake amount Mafs detected by the mass flow sensor etc. The basic fuel injection amount Qb is calculated by the basic fuel injection amount calculation means 41 (step 2), using the predetermined map relationship, from the accelerator depression amount Ac and the engine rotational speed Ne detected in step 1.

The basic smoke limit fuel injection amount Qsmklb is calculated (step 3) by the predetermined map relationship, from the final air intake amount Maff and the engine rotational speed Ne. The final smoke limit fuel injection amount Qsmklf is calculated (step 4) by correcting the smoke limit fuel injection amount Qsmklb found in step 3 based on the atmospheric pressure and/or water temperature. Steps 3 and 4 correspond to the processing content of the smoke limit fuel injection amount calculation means 46. The final target fuel injection amount Qf is determined (step 5) as the smaller of the values of the basic fuel injection amount Qb calculated in step 2 and the final smoke limit fuel injection amount Qsmklf calculated in step 4. Step 5 corresponds to the processing content of the target fuel injection amount setting means 47. The current final target fuel injection amount Qf is updated to the previous final target fuel injection amount Qf (−1) and the previous final target fuel injection amount Qf (−1) is updated to the final target fuel injection amount Qf (−2) on an occasion directly before the previous occasion (step 6).

Figure 3:
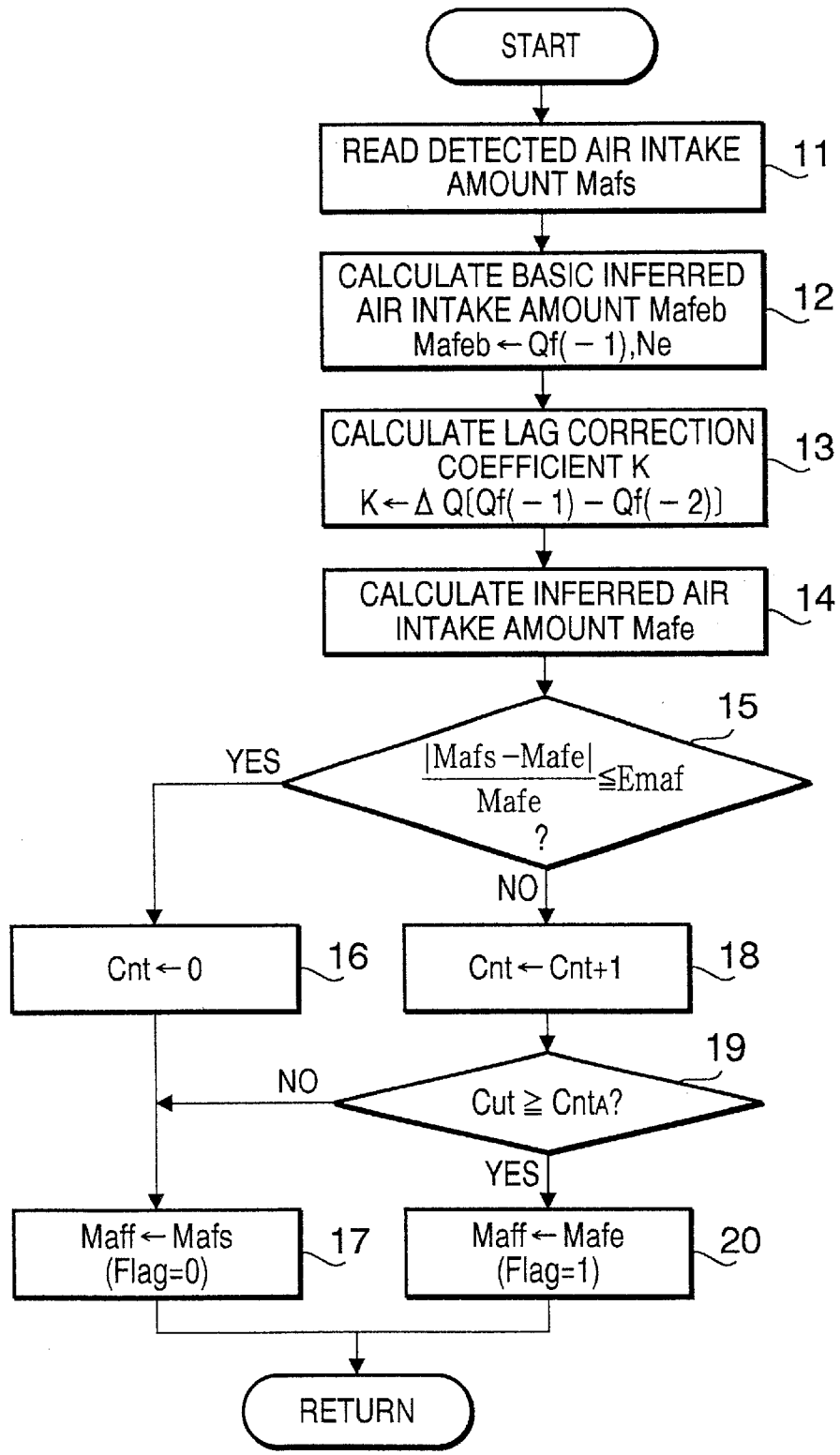
FIG. 3 is a flow chart of the determination of air intake amount in the engine fuel injection control device shown in FIG. 1.

FIG. 3 shows a flow chart of air intake amount determination. As shown in FIG. 3, the detected air intake amount Mafs detected by the mass airflow sensor 34 is read (step 11). The basic inferred air intake amount Mafeb is calculated (step 12) from the final target fuel injection amount Qf (−1) on the previous occasion updated in step 6 and the engine rotational speed Ne. The lag correction coefficient K is calculated from the previously determined map (step 13) from the previous final target fuel injection amount Qf (−1), the final target fuel injection amount Qf (−2) on the occasion directly before the previous occasion, and the injection amount deviation ΔQ. The inferred air intake amount Mafe (−1) on the previous occasion is corrected in accordance with the calculation formula (1) given above, using the lag correction coefficient K and the basic inferred air intake amount Mafeb, and in addition the inferred air intake amount Mafe is calculated (step 14) by correcting Mafe (−1) using the intake air temperature.

It is then ascertained (step 15) whether or not the air amount deviation ΔMaf which is the deviation between the detected air intake amount Mafs and the inferred air intake amount Mafe is below a fixed level. Specifically, it is ascertained whether or not the ratio obtained by dividing the absolute value of the deviation between the detected air intake amount Mafs and the inferred air intake amount Mafe by the inferred air intake amount Mafe is at or below error width Emaf. If the above ratio is at or below the error width Emaf, 0 is substituted for the count value Cnt of the timer (step 16), and the detected air intake amount Mafs is taken as the final air intake amount Maff (step 17). If this ratio exceeds the error width Emaf, the count value Cnt of the timer is incremented by one (step 18) and a determination is made as to whether or not the count value Cnt is at or above the predetermined value $Cnt_A$ (step 19). If the count value Cnt has not reached $Cnt_A$, it is assumed that the fact that this ratio has exceeded the error width Emaf is a temporary phenomenon and processing shifts to step 17, the detected air intake amount Mafs being taken as the final air intake amount Maff. If the count value Cnt has reached $Cnt_A$, it can be concluded that the phenomenon that this ratio has exceeded the error width Emaf has continued for an appreciable time, so the detected air intake amount Mafs is concluded to have a response delay with respect to the actual cylinder air intake amount, and the inferred air intake amount Mafe is taken as the final air intake amount Maff (step 20).

Construction of the engine fuel injection control device according to the embodiment of the present invention as described above confers the following benefits. Specifically, in this engine fuel injection control device, since under transient operating conditions, the air amount detected by the sensor is different from the air amount that is actually admitted, an air intake amount is inferred. If the deviation between this inferred air intake amount and the detected air intake amount detected by the sensor is at or above a fixed value, the detected air intake amount detected by the sensor is deemed to be delayed or in error, so the inferred air intake amount is selected. If the deviation is smaller than this, the detected air intake amount detected by the sensor is selected. The smoke limit fuel injection amount is determined as a limit value in this manner. It is supposed that if fuel injection amount is larger than this limit value, smoke occurs, if the fuel injection amount found from the engine operating condition exceeds this limit value, the fuel injection amount is set at this smoke limit fuel injection amount.

Consequently, with the engine fuel injection control device according to the embodiment of the present invention, it is possible to detect shift of the engine to a transient operating condition, to accurately ascertain the air intake amount even if the situation has arisen that variability is produced in the response lag, and prevent generation of smoke or insufficiency of engine output due to excessive limits being imposed on the fuel injection amount by determining a suitable fuel injection amount in relation to the air intake amount. It should be noted that, although the description was given assuming the case where the cylinder air intake amount has a response lag in relation to the value detected by the air intake amount detection means constituted by a mass airflow sensor when the operating condition of the engine is in a transient state, the engine fuel injection control device according to the embodiment of the present invention can also cover in the same way cases where there is a sensor malfunction or a hole in the air intake pipe etc.

What is claimed is:

1. An engine fuel injection control device comprising:
   basic fuel injection amount calculation means for calculating a basic fuel injection amount from engine rotational speed and from an amount of accelerator operation;
   air intake amount detection means arranged in an air intake pipe of an engine for detecting an air intake amount admitted to the engine;
   inferred air intake amount calculation means for calculating an inferred air intake amount inferred to be admitted to the engine by using a target fuel injection amount on the occasion prior to a current occasion and the rotational speed of the engine;
   final air intake amount determination means for comparing an air amount deviation between the detected air intake amount detected by the air intake amount detection means and the inferred air intake amount calculated by the inferred air intake amount calculation means, with a predetermined value, and for determining the detected air intake amount as a final air intake amount in response to the air intake amount deviation being at or below the predetermined value and determining the inferred air intake amount as the final air intake amount in response to the air intake amount deviation being larger than the predetermined value;
   smoke limit fuel injection amount calculation means for calculating a smoke limit fuel injection amount at which injection can be achieved in relation to the final air intake amount determined by the final air intake amount determining means, said smoke limit fuel injection amount being regarded as a limit value at which smoke occurs; and
   target fuel injection amount setting means for comparing the basic fuel injection amount calculated by the basic fuel injection amount calculating means with the smoke limit fuel injection amount, and for setting the smaller of these values as a current target fuel injection amount.

2. The engine fuel injection control device according to claim 1, wherein the inferred air intake amount calculating means calculates the inferred air intake amount by correcting a basic inferred air intake amount determined from a target fuel injection amount on a previous occasion and from a rotational speed of the engine, on the basis of an injection amount deviation of the target fuel injection amount on the previous occasion and a target fuel injection amount on the occasion directly before the previous occasion.

3. The engine fuel injection control device according to claim 2, wherein the inferred air intake amount calculating means calculates the inferred air intake amount using the following formula:

$$Mafe = Mafe(-1) + K \times \{Mafeb - Mafe(-1)\}$$

where
   Mafe is the current inferred air intake amount;
   Mafe (−1) is the inferred air intake amount on the previous occasion;
   K is a lag correction coefficient calculated using the injection amount deviation; and
   Mafeb is the basic inferred air intake amount.

4. The engine fuel injection control device according to claim 3, wherein the lag correction coefficient K is a value satisfying $0 < K < 1$.

5. The engine fuel injection control device according to claim 1, wherein the final air intake amount determining means calculates the air amount deviation by subtracting the inferred air intake amount from the detected air intake amount, compares a ratio found by dividing the absolute value of the air amount deviation by the inferred air intake amount with a prescribed error width, determines the detected air intake amount as the final air intake amount in response to the ratio being at or below the error width, and determines the inferred air intake amount as the final air intake amount in response to the ratio being larger than the error width.

6. The engine fuel injection control device according to claim 5, wherein the final air intake amount determining means determines the inferred air intake amount as the final air intake amount only if the condition of the ratio being larger than the error width continues for a prescribed time.

7. The engine fuel injection control device according to claim 1, wherein the smoke limit fuel injection amount calculating means calculates the smoke limit fuel injection amount from a map predetermined based on the final air intake amount and the engine rotational speed.

8. The engine fuel injection control device according to claim 1, wherein the engine fuel injection control device is applied to a common rail type diesel engine including:
- a high-pressure supply pump;
- a common rail that accumulates fuel supplied under pressure from the high-pressure supply pump;
- an injector that injects fuel supplied from the common rail into an engine combustion chamber when an electromagnetic actuator is driven; and
- a controller that applies control current to the electromagnetic actuator for driving the electromagnetic actuator for a prescribed time in a prescribed period.

9. An engine fuel injection control device comprising:
- a basic fuel injection amount calculation device for calculating a basic fuel injection amount from engine rotational speed and from an amount of accelerator operation;
- an air intake amount detection device arranged in an air intake pipe of an engine for detecting an air intake amount admitted to the engine,;
- an inferred air intake amount calculation device for calculating an inferred air intake amount inferred to be admitted to the engine by using a target fuel injection amount on the occasion prior to a current occasion and the rotational speed of the engine;
- a final air intake amount determination device for comparing an air amount deviation between the detected air intake amount detected by the air intake amount detection device and the inferred air intake amount calculated by the inferred air intake amount calculation device, with a predetermined value, and for determining the detected air intake amount as a final air intake amount in response to the air intake amount deviation being at or below the predetermined value and determining the inferred air intake amount as the final air intake amount in response to the air intake amount deviation being larger than the predetermined value;
- a smoke limit fuel injection amount calculation device for calculating a smoke limit fuel injection amount at which injection can be achieved in relation to the final air intake amount determined by the final air intake amount determining device, said smoke limit fuel injection amount being regarded as a limit value at which smoke occurs; and
- a target fuel injection amount setting device for comparing the basic fuel injection amount calculated by the basic fuel injection amount calculating device with the smoke limit fuel injection amount, and for setting the smaller of these values as a current target fuel injection amount.

10. The engine fuel injection control device according to claim 9, wherein the inferred air intake amount calculating device calculates the inferred air intake amount by correcting a basic inferred air intake amount determined from a target fuel injection amount on a previous occasion and from a rotational speed of the engine, on the basis of an injection amount deviation of the target fuel injection amount on the previous occasion and a target fuel injection amount on the occasion directly before the previous occasion.

11. The engine fuel injection control device according to claim 10, wherein the inferred air intake amount calculating device calculates the inferred air intake amount using the following formula:

$$Mafe = Mafe(-1) + K \times \{Mafeb - Mafe(-1)\}$$

where
Mafe is the current inferred air intake amount;
Mafe (−1) is the inferred air intake amount on the previous occasion;
K is a lag correction coefficient calculated using the injection amount deviation; and
Mafeb is the basic inferred air intake amount.

12. The engine fuel injection control device according to claim 11, wherein the lag correction coefficient K is a value satisfying $0 < K < 1$.

13. The engine fuel injection control device according to claim 9, wherein the final air intake amount determining device calculates the air amount deviation by subtracting the inferred air intake amount from the detected air intake amount, compares a ratio found by dividing the absolute value of the air amount deviation by the inferred air intake amount with a prescribed error width, determines the detected air intake amount as the final air intake amount in response to the ratio being at or below the error width, and determines the inferred air intake amount as the final air intake amount in response to the ratio being larger than the error width.

14. The engine fuel injection control device according to claim 13, wherein the final air intake amount determining device determines the inferred air intake amount as the final air intake amount only if the condition of the ratio being larger than the error width continues for a prescribed time.

15. An engine fuel injection control method comprising:
- the basic fuel injection amount calculation step of calculating a basic fuel injection amount from engine rotational speed and from an amount of accelerator operation;
- the air intake amount detection step of detecting an air intake amount admitted to the engine,;
- the inferred air intake amount calculation step of calculating an inferred air intake amount inferred to be admitted to the engine by using a target fuel injection amount on the occasion prior to a current occasion and the rotational speed of the engine;
- the final air intake amount determination step of comparing an air amount deviation between the detected air intake amount detected in the air intake amount detection step and the inferred air intake amount calculated in the inferred air intake amount calculation step, with a predetermined value, and of determining the detected air intake amount as a final air intake amount in response to the air intake amount deviation being at or below the predetermined value and determining the inferred air intake amount as the final air intake amount in response to the air intake amount deviation being larger than the predetermined value;
- the smoke limit fuel injection amount calculation step of calculating a smoke limit fuel injection amount at which injection can be achieved in relation to the final air intake amount determined in the final air intake amount determining step, said smoke limit fuel injection amount being regarded as a limit value at which smoke occurs; and
- the target fuel injection amount setting step of comparing the basic fuel injection amount calculated in the basic fuel injection amount calculating step with the smoke limit fuel injection amount, and of setting the smaller of these values as a current target fuel injection amount.

16. The engine fuel injection control method according to claim 15, wherein in the inferred air intake amount calculating step, the inferred air intake amount is calculated by correcting a basic inferred air intake amount determined from a target fuel injection amount on a previous occasion and from a rotational speed of the engine, on the basis of an injection amount deviation of the target fuel injection amount on the previous occasion and a target fuel injection amount on the occasion directly before the previous occasion.

17. The engine fuel injection control method according to claim 16, wherein in the inferred air intake amount calculating step, the inferred air intake amount is calculated by using the following formula:

$$Mafe = Mafe(-1) + K \times \{Mafeb - Mafe(-1)\}$$

where

Mafe is the current inferred air intake amount;

Mafe (−1) is the inferred air intake amount on the previous occasion;

K is a lag correction coefficient calculated using the injection amount deviation; and Mafeb is the basic inferred air intake amount.

18. The engine fuel injection control method according to claim 17, wherein the lag correction coefficient K is a value satisfying 0<K<1.

19. The engine fuel injection control method according to claim 15, wherein in the final air intake amount determining step, the air amount deviation is calculated by subtracting the inferred air intake amount from the detected air intake amount, a ratio found by dividing the absolute value of the air amount deviation by the inferred air intake amount is compared with a prescribed error width, the detected air intake amount is determined as the final air intake amount in response to the ratio being at or below the error width, and the inferred air intake amount is determined as the final air intake amount in response to the ratio being larger than the error width.

20. The engine fuel injection control method according to claim 19, wherein in the final air intake amount determining step, the inferred air intake amount is determined as the final air intake amount only if the condition of the ratio being larger than the error width continues for a prescribed time.

* * * * *